United States Patent
Damm et al.

(10) Patent No.: US 10,859,422 B2
(45) Date of Patent: Dec. 8, 2020

(54) METHOD FOR DETERMINING A REMAINING OPERATING PERIOD OF A DETECTOR UNIT

(71) Applicant: Endress+Hauser SE+Co. KG, Maulburg (DE)

(72) Inventors: Hartmut Damm, Teningen (DE); Mingzheng Jiang, Steinen (DE); Narcisse Michel Nzitchieu Gadeu, Maulburg (DE); Simon Weidenbruch, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 13 days.

(21) Appl. No.: 16/461,281

(22) PCT Filed: Oct. 10, 2017

(86) PCT No.: PCT/EP2017/075855
§ 371 (c)(1),
(2) Date: May 15, 2019

(87) PCT Pub. No.: WO2018/091206
PCT Pub. Date: May 24, 2018

(65) Prior Publication Data
US 2020/0056923 A1 Feb. 20, 2020

(30) Foreign Application Priority Data
Nov. 16, 2016 (DE) .......... 10 2016 122 048

(51) Int. Cl.
*G01F 23/288* (2006.01)
*G01T 1/17* (2006.01)
(Continued)

(52) U.S. Cl.
CPC .............. *G01F 23/288* (2013.01); *G01T 1/17* (2013.01); *G01T 1/2002* (2013.01); *G01T 1/2018* (2013.01); *G01T 1/40* (2013.01)

(58) Field of Classification Search
CPC ....... G01F 23/288; G01T 1/17; G01T 1/2002; G01T 1/2018; G01T 1/40
(Continued)

(56) References Cited

U.S. PATENT DOCUMENTS

| | | | | | |
|---|---|---|---|---|---|
| 3,800,143 | A | * | 3/1974 | Fishman | ............. G01N 23/203 |
| | | | | | 250/363.01 |
| 10,132,940 | B2 | * | 11/2018 | Mueller | ................ G01T 1/2018 |

(Continued)

FOREIGN PATENT DOCUMENTS

| | | |
|---|---|---|
| DE | 1809520 B2 | 2/1970 |
| DE | 4202142 A1 | 9/1992 |

(Continued)

*Primary Examiner* — Taeho Jo
(74) *Attorney, Agent, or Firm* — Christopher R. Powers; Endress+Hauser (USA) Holding Inc.

(57) ABSTRACT

The present disclosure relates to a method for determining a remaining operating period of a detector unit for a radiometric, density- or fill-level measuring device. The detector unit includes a photomultiplier. In such method, the control voltage of the photomultiplier is registered over at least one predetermined time period, a time rate of change function is ascertained based on control voltage registered during the predetermined time period, and the remaining operating period until reaching a maximum control voltage is calculated by means of the time rate of change function and a current control voltage, which is present at the current operating time. The method of the present disclosure permits approximation of the remaining operating period of the detector unit and, thus, timely learning of when required (Continued)

maintenance measures, especially aging related replacement of the photomultiplier, must be performed.

12 Claims, 2 Drawing Sheets

(51) Int. Cl.
    *G01T 1/20*     (2006.01)
    *G01T 1/40*     (2006.01)

(58) Field of Classification Search
    USPC ..................................................... 250/357.1
    See application file for complete search history.

(56) References Cited

U.S. PATENT DOCUMENTS

| | | | | |
|---|---|---|---|---|
| 2010/0243878 | A1* | 9/2010 | Freiburger | G01T 1/40 |
| | | | | 250/252.1 |
| 2010/0252739 | A1* | 10/2010 | Damm | G01F 23/288 |
| | | | | 250/357.1 |
| 2012/0043466 | A1* | 2/2012 | Weidenbruch | G01F 23/2885 |
| | | | | 250/362 |
| 2014/0353507 | A1* | 12/2014 | Glaser | G01F 23/292 |
| | | | | 250/357.1 |
| 2015/0014547 | A1* | 1/2015 | Damm | G01T 1/2002 |
| | | | | 250/367 |
| 2016/0320498 | A1* | 11/2016 | Benz | G01T 1/24 |
| 2018/0120454 | A1* | 5/2018 | Mueller | G01T 1/175 |

FOREIGN PATENT DOCUMENTS

| | | |
|---|---|---|
| DE | 10048559 A1 | 4/2002 |
| DE | 102006048608 A1 | 7/2010 |
| EP | 2237073 A1 | 10/2010 |
| EP | 2208031 B1 | 4/2015 |

\* cited by examiner

METHOD FOR DETERMINING A REMAINING OPERATING PERIOD OF A DETECTOR UNIT

CROSS-REFERENCE TO RELATED APPLICATIONS

The present application is related to and claims the priority benefit of German Patent Application No. 10 2016 122 048.5, filed on Nov. 16, 2016 and International Patent Application No. PCT/EP2017/075855, filed on Oct. 10, 2017, the entire contents of which are incorporated herein by reference.

TECHNICAL FIELD

The invention relates to a method for determining a remaining operating period of a detector unit for a radiometric, density or fill-level measuring device, as well as to a detector unit suitable for performing such method.

BACKGROUND

In automation technology, especially in process automation technology, field devices are often applied, which serve for registering and/or for influencing process variables. For registering process variables, sensors are applied, which are used, for example, in fill-level measuring devices, flow measuring devices, pressure- and temperature measuring devices, pH-redox potential measuring devices, conductivity measuring devices, etc. They register the corresponding process variables, such as fill level, flow, pressure, temperature, pH value, redox potential and conductivity. Serving for influencing process variables are actuators, for instance valves or pumps, via which the flow of a liquid in a pipe, tube or pipeline section, or the fill level in a container, can be changed. The terminology, "container", within the scope of the invention refers also to non-closed containers, such as, for example, vats, lake or ocean basins and river channels. In general, also all devices are referred to as field devices, which are applied near to the process and which deliver, or process, process relevant information. Therefore, in connection with the invention, the terminology, field devices, refers, supplementally, also to remote I/Os, radio adapters, and, generally, electronic components, which are arranged at the field level. A large number of these field devices are manufactured and sold by the firm, Endress+Hauser.

In the case of density or fill-level measurements, often field devices are applied whose measuring method is based on radiometry. In the case of this measuring method, radioactive radiation (for example, gamma radiation of a cesium or cobalt source) is utilized, which is transmitted from a radioactive radiation source and led through the container with the medium to be measured. After passage through the container, the transmitted radiation intensity is registered by a detector unit. By evaluating the detector signal the transmitted part of the emitted radiation intensity is determined. Based on this, the density or the fill level of the medium is determined.

The transmitted part of the radioactive radiation power after passage through the container cannot be directly detected. The radioactive radiation must first be converted by a suitable material into electromagnetic radiation in the optical spectral range, before the radiation power can be detected by a photomultiplier (or alternatively one or more avalanche photodiodes) within the detector unit. Materials, which have this property, are referred to as scintillating materials. Among others, polystyrene has this scintillating property. Only the radiation lying in the optical spectral range can be detected by the photomultiplier or avalanche photodiode.

Known from the state of the art are radiometric fill level or density measuring devices. The basic functional principle is described, for example, in the patent, EP 2 208 031 B1. This measuring principle has been successful for density determination especially for media with high density, which are not purely liquid or gaseous, but, instead, also include high fractions of solids, such as, for example, muds, oils or high viscosity media in general. In the case of fill-level measurements, the medium can even be solid bulk goods, such as gravel, sand or seeds.

Corresponding to these applications, the locations of use of radiometric fill level- or density measuring devices are located, as a rule, in difficultly accessible or even explosion endangered places. Along with that, maintenance measures for these measurings devices frequently require a certain lead time, in order timely to provide replacement parts or updated software. Therefore, it is exactly in the context of maintenance desirable to be able to detect required maintenance tasks as early as possible, in order to be able to plan as early as possible and, with targeting, the necessary maintenance measures.

SUMMARY

An object of the invention, therefore, is to provide a method, with which maintenance measures for radiometric fill level- or density measuring devices can be anticipated earlier.

The invention achieves this object by a method for determining a remaining operating period ($\Delta t_{B,r}$) of a detector unit for a radiometric, density- or fill-level measuring device, wherein the detector unit includes at least one photomultiplier having a controllable amplification factor (A), wherein the detector unit further includes a control-evaluation unit, and wherein the control-evaluation unit controls the photomultiplier in such a manner by means of a control voltage ($V_a$) that the amplification factor (A) is, for instance, constant (this can occur, for example, by means of the method described in the Auslegeschrift P 18 09 520.0 of the German Patent Office (GB1226924)). The method of the invention includes method steps as follows:

- registering the control voltage ($V_a$) over at least one predetermined time period (dt),
- ascertaining a time rate of change function ($dV_a/dt$) based on control voltage ($V_a$) registered during the predetermined time period (dt),
- calculating the remaining operating period ($\Delta t_{B,r}$) until reaching a maximum control voltage ($V_{a,max}$) by means of the time rate of change function ($dV_a/dt$) and a current control voltage ($V_{a,a}$), which is present at the current operating time ($t_{B,a}$).

The method of the invention provides the opportunity to approximate the remaining operating period ($\Delta t_{B,r}$) of the detector unit and, thus, timely to learn when required maintenance measures, especially the aging related replacement of the photomultiplier, must be performed. Such a procedure, in general, is also known as "predictive maintenance". In such case, the sequence of the method steps is not limited to the above provided sequence. Rather, it is also possible according to the invention that the individual method steps are at least partially simultaneously executed.

Moreover, the method can also be applied (cyclically) repetitively, in order always to update the calculated remaining operating period ($\Delta t_{B,r}$).

Preferably, the rate of change function ($dV_a/dt$), which analytically describes the control voltage ($V_a$) as a function of time, is ascertained over the predetermined time period (dt) by means of a regression of the control voltage ($V_a$). In such case, the mathematical type of the rate of change function ($dV_a/dt$), thus, for example, a linear-, logarithmic- or other function, can be specified. Which mathematical type is applied to the rate of change function ($dV_a/dt$) can, however, also depend on the control voltage ($V_a$) as a function of time within the predetermined time interval (dt). Accordingly, for performing the regression and/or for ascertaining a suitable mathematical (regression-)type, especially the method of least squares can be applied.

In the case of this form of the method of the invention, a further development is that a report is created, when at least one parameter of the rate of change function ($dV_a/dt$) changes beyond a predefined limit value, or when the regression type of the rate of change function ($dV_a/dt$) changes.

Advantageous in the context of the invention is, moreover, when the control voltage ($V_a$) is registered temperature compensated (thus, corrected to a standard temperature), since the ambient temperature represents besides the aging of the photomultiplier another undesired influencing variable of the amplification factor (A) of the photomultiplier.

According to the invention, there are different options for choosing the predetermined time period (dt), over which the control voltage ($V_a$) is registered: a first option provides that the predetermined time period (dt) extends over the entire traveled operating time ($t_B$) (or a defined minimum operating time) of the detector unit (1) to the current operating time ($t_{B,a}$). In such case, this time period (dt) lengthens with continuing operating time ($t_{B,a}$) of the photomultiplier, so that the development of the amplification factor (A) over the entire traveled operating time is reflected. Alternatively to this, it is, according to the invention, moreover, an option that the predetermined time period (dt) is always selected as a constant length of time and, thus, does not get longer with continuing operating time ($t_B$). In such case, it is advantageous that the constant length of time ends with the current operating time ($t_{B,a}$), so that, in each case, only the current development of the amplification factor (A) directly before the current operating time ($t_{B,a}$) is taken into consideration for calculating the remaining operating period ($\Delta t_{B,r}$).

In the context of the invention, possible time intervals, in which the control voltage ($V_a$) is registered, are not rigidly prescribed. For the purpose of reducing the registered data set, it is, however, advantageous that the registering of the control voltage ($V_a$) be performed, at least within the predetermined duration (dt), in predefined time intervals, which are especially greater than one day.

An object of the invention is achieved further by a detector unit for a radiometric, density- or fill-level measuring device, which is suitable for performing the method described in at least one of the preceding embodiments. Accordingly, such radiometric, density- or fill-level measuring device includes:

A scintillator,
a photomultiplier optically coupled with the scintillator and having a controllable amplification factor (A), and
a control-evaluation unit.

In such case, an advantageous embodiment of the detector unit of the invention provides that the control-evaluation unit supplementally performs the registering of the control voltage ($V_a$) and/or the ascertaining of a time rate of change function ($dV_a/dt$) and/or the calculating of the remaining operating period ($\Delta t_{B,r}$). Correspondingly, in this case, a possible extra computing unit for these calculations does not have to be provided. Furthermore, the detector unit advantageously includes a corresponding display unit for display of the remaining operating period ($\Delta t_{B,r}$). Alternatively or supplementally to this, it would naturally also be an option that the detector unit transmits the calculated remaining operating period ($\Delta t_{B,r}$) (in given cases, wirelessly) to a superordinated unit, for example, a process control station. In this way, it would be possible to monitor the probable remaining operating period ($\Delta t_{B,r}$) per remote diagnostics.

BRIEF DESCRIPTION OF THE DRAWING

The invention will now be explained based on the appended drawing, the two figures of which show as follows.

DETAILED DESCRIPTION

Figure 1:
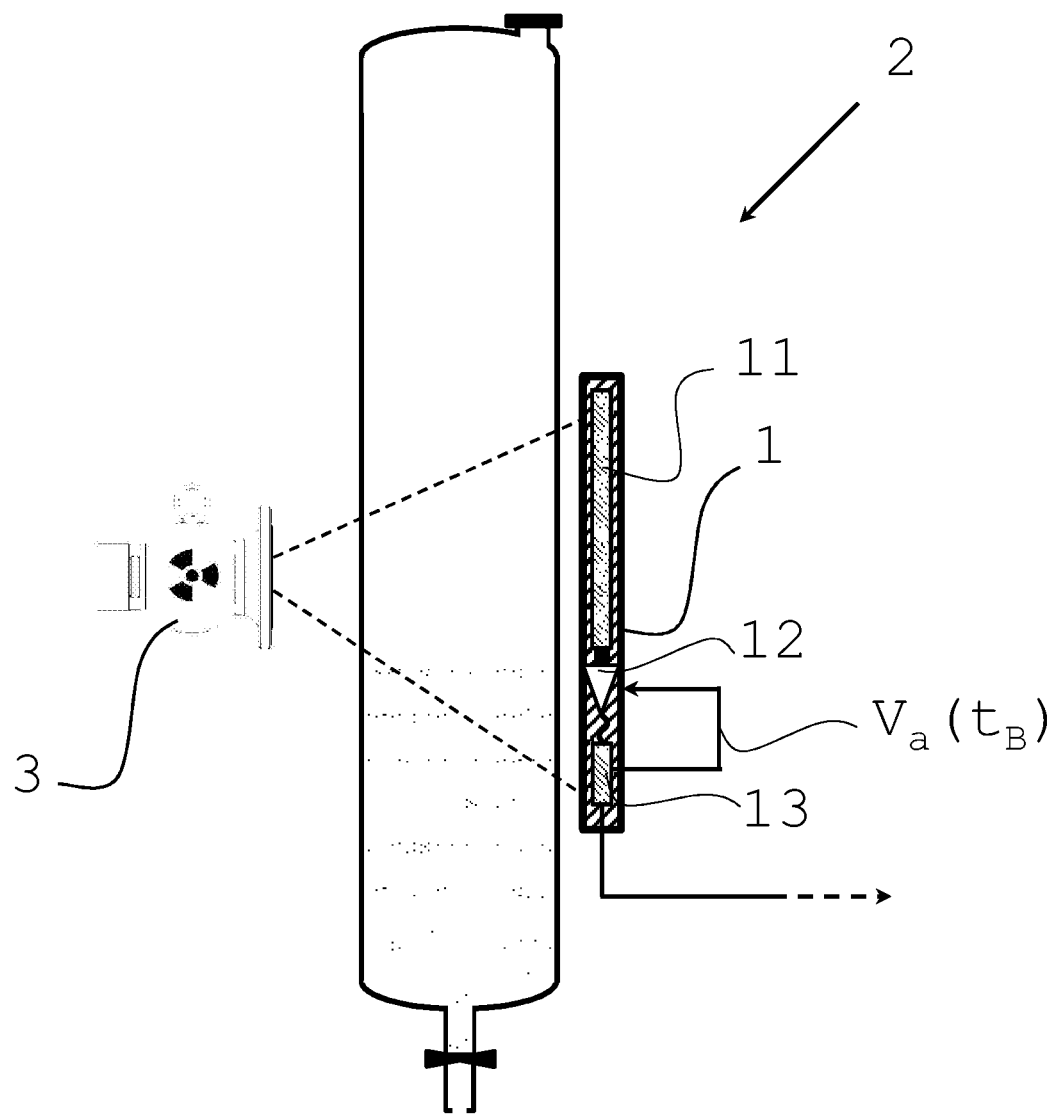
FIG. 1 shows an arrangement of a detector unit of the present disclosure at a container.

Shown in FIG. 1 is a detector unit 1 of the invention for a radiometric, density- or fill-level measuring device 2. Besides the detector unit 1, the density- or fill-level measuring device 2 includes a radioactive radiation source 3. FIG. 1 shows how the radiometric, density- or fill-level measuring device 2 is typically arranged at a container containing a fill substance, whose fill level or density is to be determined.

The radiation source 3 is placed such that it sends radioactive radiation in the direction of the container containing the fill substance to be measured. In the case of fill level measurement, the radioactive radiation is differently greatly absorbed as a function of the fill level, so that after passage through the container a corresponding intensity of the radioactive radiation strikes the detector unit 1. In support of this, the detector unit 1 is arranged with reference to the radiation source 3, for instance, on the oppositely lying side of the container, such that it is located roughly in the center of the radiation lobe of the radiation source 3. In the case of density measurement, the radiation intensity at the detector unit 1 results based on the density of the fill substance (at least in the case of vertically arranged containers, the proviso for this is that in the case of non-gaseous fill substance the fill level exceeds the heights, to which the radiation source 3 and the detector unit 1 extend).

The detector unit 1 includes a scintillator 11 for receiving the radioactive radiation and for converting it into light in the optical- or near infrared region. For transmitting the light, the scintillator 11 is coupled (for example, via a window transparent for the light) to a photomultiplier 12. Via a control-evaluation unit 13 arranged (with reference to the scintillator 11) on the rear side of the photomultiplier 12, light power incoming to the photomultiplier 12 is, on the one hand, evaluated. On the other hand, the control-evaluation unit 13 controls the amplification factor A of the photomultiplier 12 by means of a control voltage $V_a$, which can be a number of hundred volts to more than a kV. In such case, the amplification factor A of the photomultiplier 12 is that factor, with which the light power incoming to the photomultiplier 12 is amplified into an electrical output power. The control of the photomultiplier 12 by means of the control voltage ($V_a$) proceeds in such a manner that the amplification factor (A) is held as constant as possible (apart from a possible additional compensating of the temperature effect) over the operating time $t_B$ of the detector unit 1.

For electrical connection of the detector unit 1, the control-evaluation unit 13 is, additionally, connectable (for example, via an electrical cable connection, such as a multipoled plug) to a superordinated unit, for example, a process control room.

Depending on field of application, the detector unit 1 can meet certain explosion protection specifications. This can occur, for example, by encapsulating the detector unit 1 by means of a corresponding pressure resistant housing (especially according to the series of standards EN 60079-1.

Figure 2:
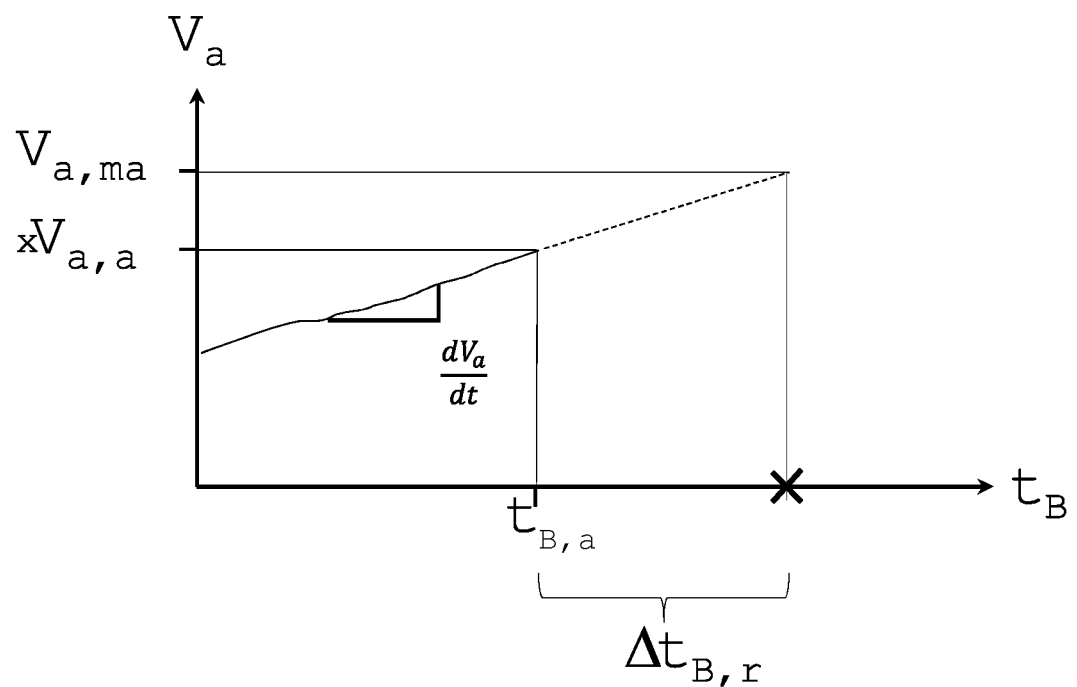
FIG. 2 shows a schematic diagram for calculating the remaining operating period according to the disclosure.

The diagram of FIG. 2 illustrates the method of the invention, by means of which the probable remaining operating period $\Delta t_{B,r}$ of the detector unit 1 can be calculated (starting from its current operating time $t_{B,a}$): The abscissa of the chart gives the progressing operating time $t_B$ of the detector unit 1, while the ordinate provides the required control voltage $V_a$. As can be seen from the diagram, the control voltage $V_a$ from the control-evaluation unit 13 must be increased with increasing operating time $t_B$, in order to keep the amplification factor A of the photomultiplier 12 constant. The reason is its aging behavior. Permitted to be applied to the photomultiplier 12, however, is, at most, a maximum control voltage $V_{a,max}$. This limit can, on the one hand, result from the photomultiplier 12 itself. On the other hand, the limit can, however, also be brought about by explosion protection specifications that need to be met.

According to the invention, in the vicinity of the operating time $t_B$, the control voltage $V_a$ is registered over a predefined time period dt. Thereupon, a time rate of change function $dV_a/dt$ is ascertained based on control voltage $V_a$ registered over the predetermined time period dt. Both the registering and the ascertaining are performed by the control-evaluation unit 13 in the case of the example of an embodiment shown in FIG. 1. In the schematic diagram of FIG. 2, ascertainment of the rate of change function $dV_a/dt$ occurs based on a linear regression of registered control voltage $V_a$. The so obtained rate of change function $dV_a/dt$ is applied, using the current control voltage $V_{a,a}$, in order to calculate a probable remaining operating period $\Delta t_{B,r}$ until the reaching of the maximum control voltage $V_{a,max}$.

The invention claimed is:

1. A method for determining a remaining operating period of a detector unit of a radiometric, density or fill level measuring device, the method comprising:
   providing a radiometric, density or fill level measuring device including a detector unit, which includes a photomultiplier having a controllable amplification factor, and a control-evaluation unit configured to control the photomultiplier using a control voltage such that the amplification factor is constant;
   registering the control voltage over a predetermined time period;
   ascertaining a time rate of change function based on the control voltage registered during the predetermined time period; and
   calculating a remaining operating period of the detector unit using the time rate of change function and a current control voltage at a current operating time, wherein the remaining operating period is a period until the current control voltage exceeds a maximum control voltage.

2. The method of claim 1, wherein the time rate of change function is ascertained using a regression of the control voltage over the predetermined time period.

3. The method of claim 2, wherein a least squares method is used for the regression and/or for ascertaining a suitable regression type.

4. The method of claim 2, further comprising creating a report when at least one parameter of the time rate of change function changes beyond a predefined limit value or when the regression type of the rate of change function changes.

5. The method of claim 1, wherein the control voltage is registered temperature compensated.

6. The method of claim 1, wherein the predetermined time period extends over an entire operating time of the detector unit to the current operating time.

7. The method of claim 1, wherein the predetermined time period is constant and ends with the current operating time.

8. The method of claim 1, wherein the registering of the control voltage is performed at least within the predetermined time period in predefined time intervals.

9. The method of claim 1, wherein the predefined time intervals are greater than one day.

10. The method of claim 1, further comprising displaying the calculated remaining operating period via a display unit.

11. A detector unit for a radiometric, density or fill level measuring, comprising:
   a scintillator;
   a photomultiplier optically coupled with the scintillator and having a controllable amplification factor; and
   a control-evaluation unit configured to:
      control the photomultiplier using a control voltage such that the amplification factor is constant;
      register the control voltage over a predetermined time period;
      ascertain a time rate of change function based on the control voltage registered during the predetermined time period; and
      calculating a remaining operating period of the detector unit using the time rate of change function and a current control voltage at a current operating time, wherein the remaining operating period is a period until the current control voltage exceeds a maximum control voltage.

12. The detector unit of claim 11, further comprising a display unit configured to display the calculated remaining operating period.

* * * * *